US009791959B2

(12) United States Patent
Tilak et al.

(10) Patent No.: US 9,791,959 B2
(45) Date of Patent: Oct. 17, 2017

(54) SYSTEM AND METHOD FOR HOST-AUGMENTED TOUCH PROCESSING

(71) Applicant: QUALCOMM Incorporated, San Diego, CA (US)

(72) Inventors: Raghukul Tilak, San Diego, CA (US); Suhail Jalil, San Diego, CA (US); Louis Dominic Oliveira, San Diego, CA (US); Fariborz Pourbigharaz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/149,458

(22) Filed: Jan. 7, 2014

(65) Prior Publication Data

US 2015/0193070 A1    Jul. 9, 2015

(51) Int. Cl.
*G06F 3/041* (2006.01)
*G06F 1/26* (2006.01)

(52) U.S. Cl.
CPC .............. *G06F 3/0416* (2013.01); *G06F 1/26* (2013.01); *G06F 3/041* (2013.01); *G06F 3/0418* (2013.01); *G06F 2203/04106* (2013.01)

(58) Field of Classification Search
CPC ...... G06F 3/0416; G06F 3/0418; G06F 3/044; G06F 3/041; G06F 1/26; G06F 2203/04106
See application file for complete search history.

(56) References Cited

U.S. PATENT DOCUMENTS

| 5,565,894 | A    | 10/1996 | Bates et al. |
| 6,459,424 | B1   | 10/2002 | Resman |
| 6,492,979 | B1   | 12/2002 | Kent et al. |
| 7,180,508 | B2 * | 2/2007  | Kent et al. ............ 345/178 |
| 7,997,132 | B2 * | 8/2011  | Ross et al. ............ 73/304 C |
| 8,181,874 | B1   | 5/2012  | Wan et al. |
| 8,294,687 | B1 * | 10/2012 | Ksondzyk ........... G06F 3/0418 178/18.01 |
| 8,319,746 | B1 * | 11/2012 | Ho et al. ............... 345/173 |
| 8,615,221 | B1 * | 12/2013 | Cosenza et al. ....... 455/414.1 |
| 8,754,746 | B2 * | 6/2014  | Lukas et al. ........... 340/5.82 |
| 9,013,855 | B2 * | 4/2015  | Rothkopf .............. 361/170 |
| 9,262,182 | B2 * | 2/2016  | Mullens ............ G06F 9/4451 |
| 9,294,864 | B2 * | 3/2016  | Chen ................. G06F 3/0487 |

(Continued)

FOREIGN PATENT DOCUMENTS

| EP | 2275907 A2 | 1/2011 |
| EP | 2515215 A1 | 10/2012 |

OTHER PUBLICATIONS

Partial International Search Report—PCT/US2015/010163—ISA/EPO—Apr. 9, 2015.

(Continued)

*Primary Examiner* — Peter D McLoone
(74) *Attorney, Agent, or Firm* — Knobbe, Martens, Olson & Bear, LLP (57) ABSTRACT

Systems and methods for host-augmented touch-sensing are disclosed. The energy-efficiency of a touch sensitive device may be improved by dynamically adjusting the scanning sensitivity of the touch sensor based on host-augmented environmental information such as temperature, pressure, position, orientation, humidity, force, or battery charging mode.

22 Claims, 3 Drawing Sheets (56) References Cited

U.S. PATENT DOCUMENTS

| | | | |
|---|---|---|---|
| 9,519,423 B2* | 12/2016 | Tokutake | G06F 3/0416 |
| 2004/0061687 A1* | 4/2004 | Kent et al. | 345/173 |
| 2006/0223547 A1* | 10/2006 | Chin et al. | 455/456.1 |
| 2008/0303782 A1 | 12/2008 | Grant et al. | |
| 2008/0309631 A1 | 12/2008 | Westerman et al. | |
| 2009/0251434 A1 | 10/2009 | Rimon et al. | |
| 2009/0301190 A1* | 12/2009 | Ross, Jr. et al. | 73/304 |
| 2010/0153313 A1 | 6/2010 | Baldwin et al. | |
| 2010/0265209 A1 | 10/2010 | Nurmi et al. | |
| 2011/0012840 A1* | 1/2011 | Hotelling et al. | 345/173 |
| 2011/0118026 A1* | 5/2011 | Lukas et al. | 463/37 |
| 2011/0193809 A1 | 8/2011 | Walley et al. | |
| 2011/0210942 A1* | 9/2011 | Kitamori et al. | 345/174 |
| 2011/0261005 A1 | 10/2011 | Joharapurkar et al. | |
| 2011/0304550 A1 | 12/2011 | Romera Jolliff et al. | |
| 2012/0050229 A1 | 3/2012 | Tenuta et al. | |
| 2012/0068958 A1 | 3/2012 | Chen | |
| 2012/0176343 A1 | 7/2012 | Holmgren et al. | |
| 2012/0268378 A1 | 10/2012 | Tokutake | |
| 2013/0002531 A1 | 1/2013 | Krahenbuhl et al. | |
| 2013/0021303 A1 | 1/2013 | Martin et al. | |
| 2013/0050132 A1 | 2/2013 | Calpe Maravilla et al. | |
| 2013/0069897 A1* | 3/2013 | Liu | G06F 3/0488 345/173 |
| 2013/0141346 A1* | 6/2013 | Oh | 345/173 |
| 2013/0181951 A1 | 7/2013 | Klinghult et al. | |
| 2013/0191625 A1* | 7/2013 | Mullens | G06F 9/4451 713/100 |
| 2013/0265243 A1 | 10/2013 | Law | |
| 2013/0265276 A1 | 10/2013 | Obeidat et al. | |
| 2013/0335338 A1 | 12/2013 | Lai et al. | |
| 2014/0120891 A1* | 5/2014 | Chen et al. | 455/418 |
| 2014/0197698 A1* | 7/2014 | Rothkopf | 307/117 |
| 2014/0204035 A1 | 7/2014 | Chang | |
| 2015/0193031 A1 | 7/2015 | Tilak et al. | |
| 2015/0370410 A1* | 12/2015 | Sauer | G06F 3/0418 345/173 |
| 2016/0062494 A1* | 3/2016 | Zuber | G06F 3/0418 345/173 |

OTHER PUBLICATIONS

International Search Report and Written Opinion—PCT/US2015/010163—ISA/EPO—Jul. 1, 2015.

* cited by examiner

SYSTEM AND METHOD FOR HOST-AUGMENTED TOUCH PROCESSING

TECHNICAL FIELD

The systems and methods disclosed herein relate generally to touch-sensing devices, and more particularly, to touch-sensing devices that incorporate augmentation information available in a host system to improve touch sensing implementation.

BACKGROUND

Advances in technology have resulted in smaller and more powerful computing devices. For example, there currently exist a variety of portable computing devices, including wireless computing devices such as wireless telephones, personal digital assistants (PDAs), and tablet computers that are small, lightweight, and easily carried by users. In order to simplify user interfaces and to avoid pushbuttons and complex menu systems, such portable computing devices may use touch screen displays that detect user gestures on the touch screen and translate the detected gestures into commands to be performed by the device. Such gestures may be performed using one or more fingers or a stylus type pointing implements in contact with or in close proximity to a sensing surface. The term Quality-of-Service (QoS) is collectively used to represent several properties of touch screen implementations such as position update rate, accuracy of determined touch position, touch position determination resolution, the maximum number of objects tracked simultaneously, usage modalities such as contact or contactless operation, detection sensitivity, etc.

Touch sensing function is heavily impacted by environmental factors like conducted or radiated electromagnetic noise, temperature, humidity, etc. Electromagnetic noise from several sources is known to interfere with touch sensing functions resulting in degraded quality of service (QoS). Many touch sensing implementations have built-in mechanisms that use avoidance and mitigation strategies. In isolation, these mechanisms are not very efficient or effective because these mechanisms make assumptions about the presence and characteristic of the environmental factors that may interfere with touch sensing.

SUMMARY

Aspects of the disclosure relate to systems and methods for improving the energy efficiency and related user experience of electronic devices such as mobile phones, tablets, and laptop computers employing touch screen-based user input methods. In some aspects, user experience and overall energy-efficiency can be improved while maintaining QoS by dynamically managing the touch sensing implementation in real time, based on environmental information obtained from several direct or indirect means including sensors connected to the host system. Environmental information may include characteristics of radiated or conducted electromagnetic noise, temperature, humidity, etc. The host system has access to data from various sensors (for example, accelerometer, camera, gyro, humidity sensor, force sensor, temperature sensor, etc.) which may be used to augment touch sensing function.

In one aspect, a touch-sensitive display system for an electronic device includes a touch sensitive surface, an environmental sensor, and a control module. The control module may be configured to continuously acquire data regarding an environmental condition from the environmental sensor and dynamically adjust a one or more of a scan rate, a scan region, and a touch sensor excitation signal of a touch sensitive surface of the display based on the sensed environmental condition. The control module may be further configured to determine a charging mode of the electronic device, characterize a frequency of electromagnetic noise generated by the charging mode, and dynamically adjust the scan rate and a touch sensor excitation signal of the touch sensitive surface based on the characterized noise frequency. The environmental sensor may include at least one of one or more capacitive sensors, resistive sensors, pressure sensors, positional sensors, thermal sensors, optical sensors, gyroscopic sensors, electromagnetic sensors, vibration sensors, acoustic sensors, or accelerometers. Additionally, the environmental condition is one of temperature, humidity, orientation of the electronic device, and acceleration.

In some aspects, the control module may be configured to reconfigure an ultrasound sensing infrastructure of the electronic device to improve a signal-to-noise ratio. In other aspects, the control module may be further configured to corroborate a weak ground coupling event based on a sensed position of the electronic device and dynamically reconfigure an analog front-end of the electronic device to counteract the weak ground coupling event. In yet other aspects, the control module is further configured to suppress a false positive touch event based on a lack of vibration information from the vibration sensor.

In another aspect, a method for improving the energy efficiency of touch-sensing devices includes the steps of sensing one or more environmental conditions with an environmental sensor of the touch-sensing device, analyzing information provided by the environmental sensor, corroborating a touch sensing function using the information provided by the environmental sensor, and dynamically adjusting a sensitivity of a touch sensitive surface of the electronic device based on the sensed one or more environmental conditions. Sensing one or more environmental conditions may include sensing at least one of pressure, resistance, temperature, orientation, position, vibration, ambient light, sound, and electromagnetic interference. The method may further include the steps of determining a charging mode of the electronic device, characterizing a frequency of electromagnetic noise generated by the charging mode, and adjusting the sensitivity of the touch sensitive surface based on the characterized noise frequency. The sensitivity may be scanning sensitivity or resolution sensitivity. In some aspects, sensing the environmental conditions includes sensing vibration conditions and corroborating the touch sensing conditions includes corroborating a touch event on the touch sensitive surface with a detected vibration.

In yet another aspect, a non-transitory computer-readable medium includes instructions that, when executed, causes a processor to perform a method including the steps of sensing one or more environmental conditions with an environmental sensor of an electronic device, determining a charging mode of the electronic device, characterizing a frequency of electromagnetic noise generated by the charging mode, and dynamically adjusting a sensitivity of a touch sensitive surface based on the sensed environmental condition and the characterized electromagnetic noise frequency. The sensitivity may be a scanning sensitivity or resolution sensitivity. Sensing one or more environmental conditions may further include sensing at least one of pressure, resistance, temperature, pressure, orientation, vibration, ambient light, sound, and electromagnetic interference.

In another aspect, an apparatus for energy efficient touch processing includes a touch sensitive surface of an electronic device, means for sensing one or more environmental conditions of the touch sensitive surface, means for analyzing information provided by the environmental sensor, means for corroborating a touch sensing function using the information provided by the environmental sensor, and means for dynamically adjusting a sensitivity of a touch sensitive surface based on the sensed one or more environmental conditions. The apparatus may further include means for determining a charging mode of the electronic device, means for characterizing a frequency of electromagnetic noise generated by a charging mode of the electronic device, and means for dynamically adjusting a scan rate and a sensor excitation signal of the touch sensitive surface based on the characterized electromagnetic noise frequency. The sensitivity may be a scanning sensitivity or resolution sensitivity. In some aspects, the means for sensing includes a capacitive sensor, resistive sensor, pressure sensor, positional sensor, thermal sensor, optical sensor, gyroscopic sensor, electromagnetic sensor, vibration sensor, acoustic sensor, or accelerometer. In some aspects, the apparatus is a mobile telephone. In some aspects, the means for dynamically adjusting the sensitivity of the touch sensitive surface includes a processor configured to adjust the scan rate of the touch sensitive surface.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Overview

Implementations disclosed herein relate to systems and methods for dynamically controlling the touch sensing function of electronic devices such as mobile phones, tablets, and laptop computers having touchscreen displays depending on environmental factors. Aspects of the function which may be controlled include frequency, amplitude, and phase of sensor excitation signal, sensor scan rate, A/D resolution, critical decision making thresholds, and type of algorithms, among other aspects. In some aspects, for requested quality of service, energy-efficiency can also be improved by dynamically adjusting the function of the touchscreen sensor in real time, based on environmental information.

Touch sensing quality of service (QoS) comprises aspects such as the number of contacts tracked simultaneously, position update rate, and position accuracy of reported contacts. Conventional touch sensing implementations are usually statically configured and operate in isolation from the ever-changing environment to produce a desired quality of service in most environmental conditions for all touchscreen applications. This can lead to poor energy efficiency since demanding environmental conditions are not present all of the time and energy spent to cater or counter such conditions when damaging environmental conditions are not present is wasteful. Furthermore, in such sub-optimal systems, built-in noise mitigation mechanisms may operate continuously, even when the sources of interfering noise are not present.

In one aspect, sensors within the device inform the system if other processes are ongoing and thereby provide feedback that may be used to improve the touch process or function of the touch sensitive device. For example, if the electronic device is charging, EMI interference can cause issues with touchscreen functionality. If the system is aware that the device is charging, the system can employ counter-measures to mitigate those problems. These counter-measures may include mitigation techniques such as sensor oversampling, conservative adaptive decision thresholds, temporal permanence filtering, etc. or avoidance techniques such as employing the use of cleaner frequency bands along with high voltage excitation signals. These mitigation and avoidance techniques result in additional processing work which further results in increased energy consumption by the device. Clean frequency bands can be determined by employing search techniques or performing periodic on-the-fly spectral analysis of the noise signal. The system can then adjust the scan rate and sensor excitation signal dynamically as needed, depending on the environmental conditions. In addition to the presence of a charger, the host system can detect the mode of charging, which can affect the intensity of the electromagnetic noise. The host system can then communicate this information to the touch sensing controller. Based on this information, the touch sensing controller could make modifications to ensure optimal energy usage as the device transitions from one charging mode to another.

In some embodiments, orientation, placement, and motion feedback information obtained from a variety of sensors on the mobile device can be used to corroborate or qualify decisions made by the touch detection function. The host system can use the force sensor, gyro, and accelerometer to measure pressure and identify a vibration signature generated by a physical touch from a user to augment the touch sensing function and improve the interpretation of the user's touch. For example, a contact detected by the touch sensing implementation but not corroborated with any vibration feedback caused by physical touch could be disqualified as a false positive touch event. Similarly, when a device placed horizontally flat on a table is not reporting any motion, the device may be isolated from bulk ground. This, along with a measured low signal level, can be used to corroborate a weak ground coupling scenario. The touch sensing implementation can counteract this by dynamically reconfiguring the analog front-end as needed to use high-gain at the expense of energy.

Other environmental factors such as temperature, humidity, and proximity to fluorescent light may not greatly affect touch sensing. However, these factors can degrade the capabilities of the touch sensing function over a period of time and affect QoS, if not mitigated. Information regarding these secondary environmental effects may be used to cue the touch sensing functions to make more informed decisions. The sensors that detect changes in these environmental factors can feed the information to the system allowing better estimation and management of noise. For example, the host system can use these sensors to track changes in temperature and humidity and provide relevant information to touch sensing implementations, allowing them to distinguish changes caused by temperature and humidity from ones caused by noise, thereby allowing the system to adapt correctly and more rapidly.

In the absence of augmentation information on these secondary environmental effects, current touch sensing implementations use time permanence to qualify decisions made by the touch sensing function. Time permanence generally requires multiple sensor scan cycles to qualify changes and thus can add to latency in detecting and responding to touch operations.

Changes in ambient temperature and humidity can result in a change in baseline readings from the touch sensor. Similar changes in baseline readings can result from electromagnetic noise. Time permanence may be used to validate these changes before they are used to modify a touch sensing implementation. This adds to latency and limits the ability of the touch sensing implementation to adapt to rapid changes in temperature and humidity. However in some embodiments, the host system can use environmental sensors to keep track of changes in temperature and humidity. The host system can then provide relevant information to the touch sensing system, allowing for distinctions and adjustments based on changes caused by temperature and humidity from changes caused by noise. This can allow the touch sensing implementation to adapt more rapidly to changing environmental conditions. Host augmented processing techniques can be applicable to many 'sensing' techniques besides touch. For example, gestures detected by ultrasonic sensors may be susceptible to temperature as well as other ultrasound interfering devices like motion detectors. The host may detect noise source presence or sense high temperatures before reconfiguring an ultrasonic sensing infrastructure for better signal-to-noise ratio and therefore more reliable gesture detection.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

System Overview

Figure 1:
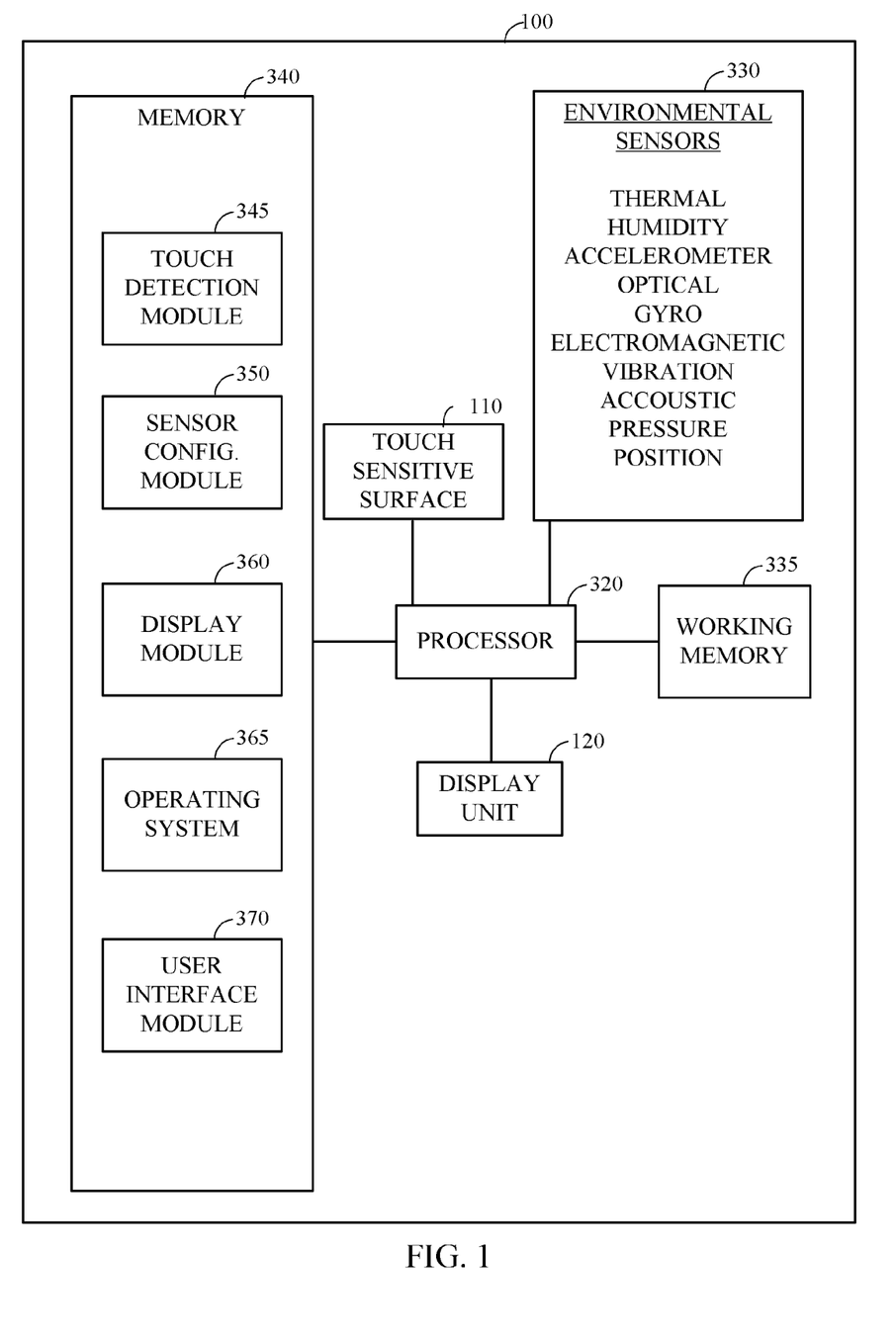
FIG. 1 is a schematic block diagram depicting a touch sensitive display system implementing some operative elements.

FIG. 1 illustrates one implementation of a touch sensitive display system 100 capable of dynamically modifying the characteristic properties of a touch sensing implementation such as report rate and resolution by changing the overall QoS operating mode of the touch sensing implementation, based on environmental information. The illustrated embodiment is not meant to be limitative and the system 100 may include a variety of other components as required for other functions.

The touch sensitive display system 100 may include a touch sensitive surface 110 and a touch sensitive display unit 120. Certain embodiments of display unit 120 may be any flat panel display technology, such as an LED, LCD, plasma, or projection screen. Display unit 120 may be coupled to the processor 320 for receiving information for visual display to a user. Such information may include, but is not limited to, visual representations of files stored in a memory location, software applications installed on the processor 320, user interfaces, and network-accessible content objects.

Touch sensitive surface 110 may employ one or a combination of many touch sensing technologies, for instance capacitive, resistive, surface acoustic wave, or optical touch sensing. The touch sensing technology may support multi-touch gestures. In some embodiments, the touch sensitive surface 110 may overlay or be positioned over display 120 such that visibility of the display 120 is not impaired. In other embodiments, the touch sensitive surface 110 and display 120 may be tightly integrated into a single panel, module, or a surface. The touch sensitive surface 110 may be configured to align with display 120 such that a user touch on the touch sensitive surface 110 is associated with a portion of the content displayed on display unit 120 produces an output coordinate in the coordinate system used by display unit 120 to place content across the visual area of the display unit 120. In some embodiments, the touch sensitive surface 110 may be a standalone touch sensitive surface without a corresponding display, such as, for example, a touch sensitive surface incorporated into the back surface of a tablet.

The touch sensitive display system 100 can further include a processor 320 linked to the touch sensitive surface 110. A working memory 335, electronic display 120, and memory 340 are also in communication with processor 320. The touch sensitive display system 100 may be a stationary device such as a desktop personal computer or it may be a mobile device, such as a tablet, laptop computer, or cellular telephone. A number of environmental sensors 330, such as capacitive sensors, resistive sensors, pressure sensors, positional sensors, thermal sensors, optical sensors, gyroscopic sensors, electromagnetic sensors, vibration sensors, acoustic sensors, and accelerometers, may be linked to the processor 320.

The processor 320 may be a general purpose processing unit. As shown, the processor 320 is connected to a program memory 340 and a working memory 335. In the illustrated embodiment, the program memory 340 stores a touch detection/processing module 345, a sensor configuration module 350, a display module 360, operating system 365, and a user interface module 370. These modules may include instructions that configure the processor 320 to perform various touch sensing and device management tasks. The program memory 340 can be any suitable computer-readable storage medium, such as a non-transitory storage medium. Working memory 335 may be used by processor 320 to store a working set of processor instructions contained in the modules of program memory 340. Alternatively, working memory 335 may also be used by processor 320 to store dynamic data created during the operation of touch sensitive display system 100.

The processor 320 may, in some embodiments, include instructions that when executed act as a touch screen controller (TSC) providing equivalent functionality. The specific type of TSC functionality employed will depend upon the type of touch technology used in touch sensitive surface 110. The processor 320 may be configured to start up when the touch detection module 345 indicates that a user has touched touch sensitive surface 110 and to power down after release of the touch. This feature may be useful for power conservation in battery-powered devices such as the touch sensitive device 100.

As mentioned above, the processor 320 is configured by several modules stored in the program memory 340. The touch detection module 345 can comprise computer-implemented instructions that configure the processor 320 to analyze touch events. Therefore, processor 320, along with touch detection module 345 and display 120, represent one means for acquiring user touch input on a display. The sensor configuration module 350 includes instructions that configure the processor 320 to determine a region of the touch sensor to be scanned depending on the current application or sensed environmental condition, such as position or orientation of the touch sensitive device. Therefore, processor 320, along with sensor configuration module 350, represent one means for determining and apply a scan region to a touch sensor.

The sensor configuration module 350 also includes instructions that configure the processor 320 to apply a scan rate to the identified scan region depending on the data input requirements of the current application. Additionally, the sensor configuration module 350 includes instructions that configure the processor 320 to adjust the scan rate based on the detected interference or noise signal, such as electromagnetic interference. The sensor configuration module 350 may continuously direct the processor 320 to adjust the scan rate based on information provided by the environmental sensors 330. Therefore, processor 320, along with sensor configuration module 350, represent one means for dynamically applying a scan rate to a defined scan region depending on the sensed environmental information.

Additionally, the sensor configuration module 350 may include instructions that configure the processor 320 to reconfigure excitation signals, such as ultrasonic signals. The sensor configuration module 350 may continuously direct the processor 320 to reconfigure the ultrasound sensing infrastructure for a better signal-to-noise ratio and therefore more reliable gesture detection. Therefore, processor 320, along with sensor configuration module 350, represent one means for dynamically reconfiguring the ultrasound sensing infrastructure to improve gesture detection.

Memory 340 also contains user interface module 370. The user interface module 370 includes instructions that configure the processor 320 to provide a collection of on-display objects and soft controls that allow the user to interact with the device. The user interface module 370 also allows applications to interact with the rest of the system in a uniform, abstracted way. Operating system 365 configures the processor 320 to manage the memory and processing resources of system 100. For example, operating system 365 may include device drivers to manage hardware resources such as the electronic display 120 or touch sensitive surface 110. Therefore, in some embodiments, instructions contained in the sensor configuration module 350 may not interact with these hardware resources directly, but instead interact through standard subroutines or APIs located in operating system 365. Instructions within operating system 365 may then interact directly with these hardware components.

The touch sensitive display system 100 can be implemented on a mobile device, including a mobile phone or smartphone, a tablet computer, a laptop computer, a digital camera, or the like. By integrating the processor 320, memory 340, touch sensitive surface 110, and electronic display 120 on a mobile device, the touch sensitive display system 100 can be advantageously used without requiring the system to remain in a fixed location. In other implementations, however, the touch sensitive display system 100 can comprise a desktop computer, server, computer workstation, or other type of computing device. The touch sensitive display system 100 can be integrated with the computer hardware or the touch sensitive display system can be separate from the computing device.

Although FIG. 1 depicts a system comprising separate components including a processor, a touch sensor, an electronic display, and memory, one skilled in the art would recognize that these separate components may be combined a variety of ways to achieve particular design objectives. For example, in an alternative embodiment, the memory components may be combined with processor components to save cost and improve performance.

Additionally, although FIG. 1 illustrates two memory components, including memory component 340 comprising several modules and a separate memory 335 comprising a working memory, one with skill in the art would recognize several embodiments utilizing different memory architectures. For example, a design may utilize ROM or static RAM memory for the storage of processor instructions implementing the modules contained in memory 340. Alternatively, processor instructions may be read at system startup from a disk storage device that is integrated into touch sensitive display system 100 or connected via an external device port. The processor instructions may then be loaded into RAM to facilitate execution by the processor. For example, working memory 335 may be a RAM memory, with instructions loaded into working memory 335 before execution by the processor 320.

Method Overview

Figure 2:
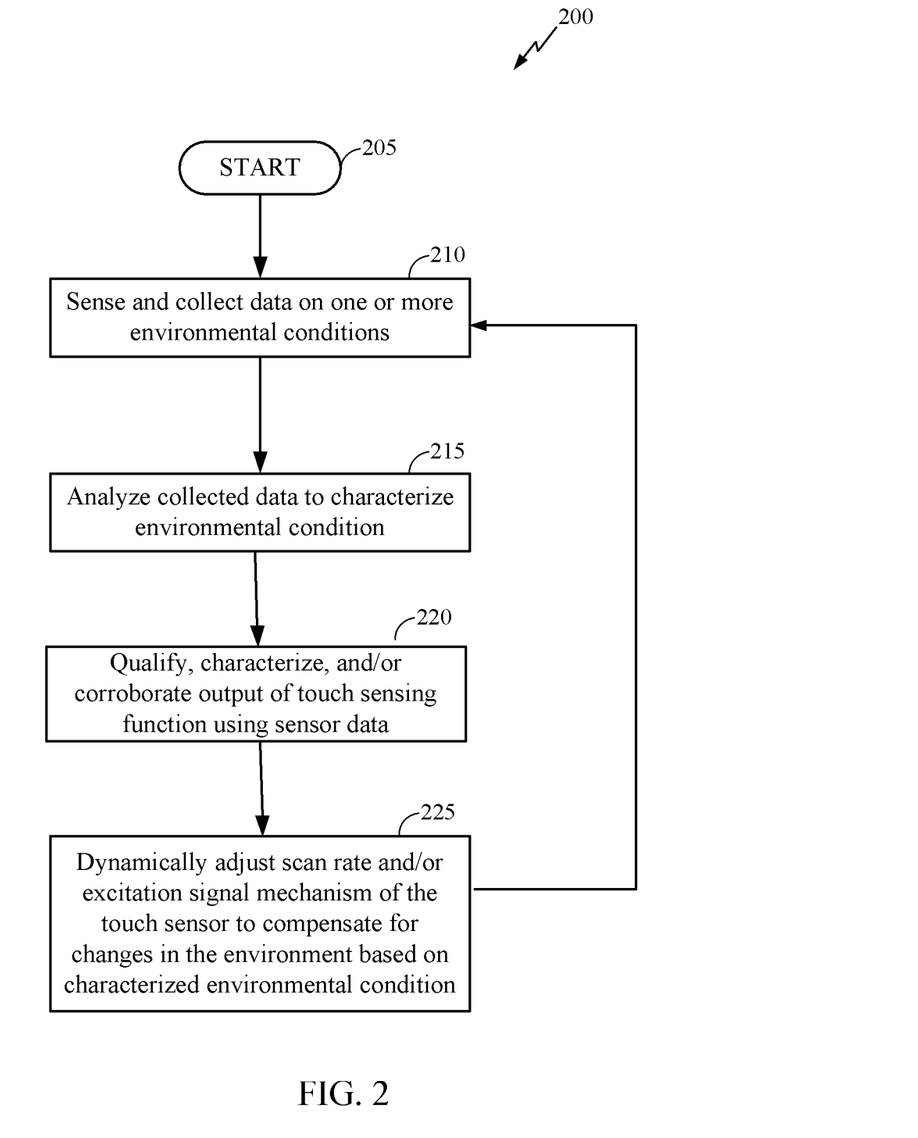
FIG. 2 is a flow chart depicting a process to dynamically modify the functions of a touch sensitive device based on environmental information, according to one embodiment.

FIG. 2 illustrates one embodiment of a process 200 that may be used to improve touch sensor data processing. The illustrated process may be executed by the touch sensitive display and host processor described above with respect to FIG. 1.

The process 200 begins at start block 205 and transitions to block 210 wherein environmental sensors of the system are used to sense and collect information on one or more environmental conditions. Process 200 then transitions to block 215 wherein the collected sensor data is analyzed to characterize the existing environmental condition. In some embodiments, the scan rate may be dynamically adjusted in response to changing environmental conditions detected by the sensors. In other embodiments, a sampling rate of the touch sensor may need to be adjusted based on the sensed environmental condition, such as ambient fluorescent light or electromagnetic interference.

Once the environmental condition has been characterized, process 200 transitions to block 220 wherein decisions made by the touch sensing function, such as whether a touch event occurred or the type of touch event, are qualified and corroborated with information obtained from the environmental sensors. After the touch sensing functions have been qualified, characterized, and/or corroborated with the sensor information, process 200 transitions to block 225 wherein the scan rate, resolution, scan region, sampling rate, and/or excitation signal mechanism of the touch sensor is dynamically adjusted to compensate for changes in the environment based on the characterized environmental condition. Once the adjustment has been applied to the touch sensor, process 200 transitions to block 210 in a repeating loop. This process may be repeated periodically or continuously, depending on the desired environmental sensor input frequency.

Figure 3:
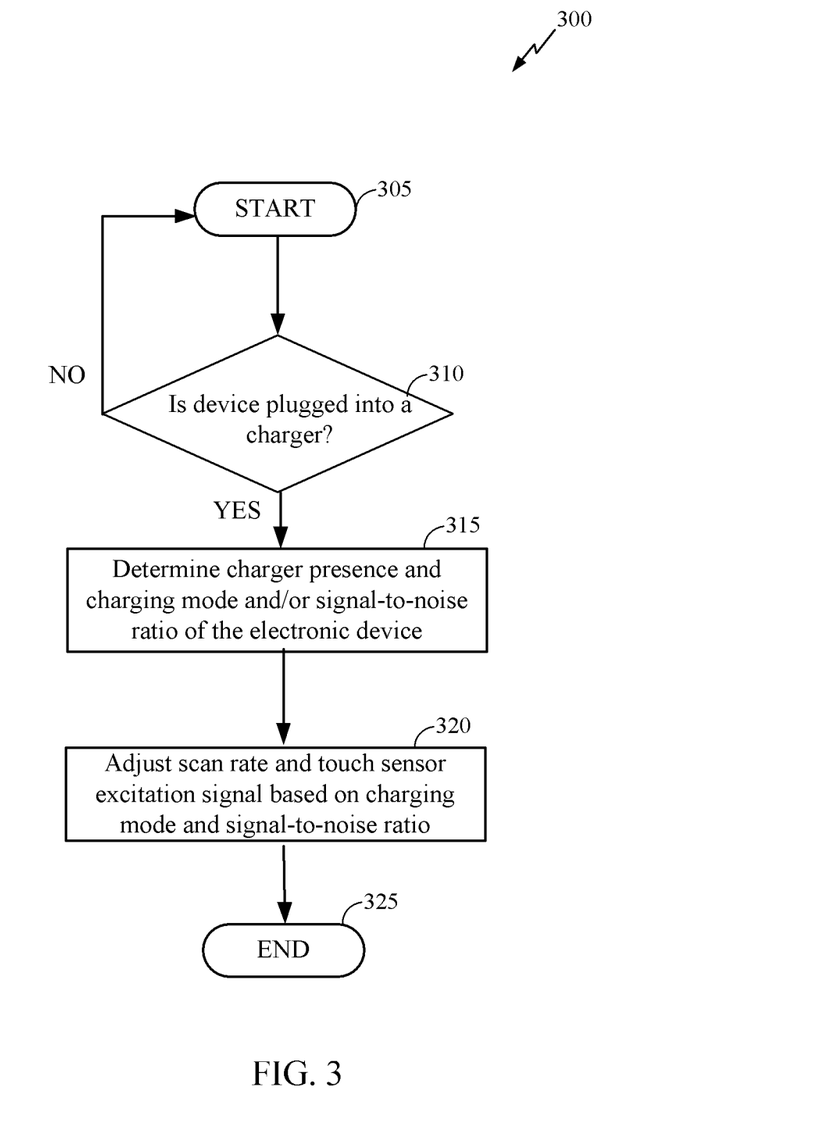
FIG. 3 is a flow chart depicting a process to dynamically modify characteristics (such as frequency, amplitude, and phase) of a signal used to excite a touch sensor based on the presence and composition of noise and charging mode (trickle-charge, constant-voltage, constant-current or top-off) of battery charging circuitry. The excitation signal will be situated in frequency bands which are not infested by noise generated by charger.

FIG. 3 illustrates one embodiment of a process 300 that may be used to improve touch sensor data function depending on the presence of electromagnetic interference due to a charger. The illustrated process may be executed by the touch sensitive display and host processor described above with respect to FIG. 1.

The process 300 begins at start block 305 and transitions to decision block 310 wherein a determination is made as to whether the touch sensitive device is plugged into a charger. If the device is plugged into a charger, then the process 300 transitions to block 315 wherein a charging presence and charging mode and/or a signal-to noise ratio of the electronic device is determined. If a determination is made at the decision block 310 that the device is not plugged into a charger, then the process 300 returns to start block 305 to repeat the process 300.

Once the charging mode has been determined, process 300 transitions to block 320 wherein a sampling or scan rate of the touch sensor may be adjusted based on the charging mode. As was discussed above, a battery being charged in constant current mode may produce stronger electromagnetic noise than when the battery is being charged in constant voltage mode. The process 300 can characterize the noise based on the charging mode and send this information to the touch sensor in order to adjust the function based on the noise condition caused by the charging battery.

As discussed above, if the system becomes aware that the device is charging, the system can employ counter-measures to mitigate those problems. These counter-measures may include mitigation techniques such as sensor oversampling, conservative adaptive decision thresholds, temporal permanence filtering, etc. or avoidance techniques such as employing the use of cleaner frequency bands along with high voltage excitation signals. These mitigation and avoidance techniques result in additional processing work which further results in increased energy consumption by the device. Clean frequency bands can be determined by employing search techniques or performing periodic on-the-fly spectral analysis of the noise signal. The system can then adjust the scan rate and sensor excitation signal dynamically as needed, depending on the environmental conditions. In addition to the presence of a charger, the host system can detect the mode of charging, which can affect the intensity of the electromagnetic noise. The host system can then communicate this information to the touch sensing controller. Based on this information, the touch sensing controller could make modifications to ensure optimal energy usage as the device transitions from one charging mode to another.

Once the adjustment has been applied to the touch sensor, process 300 transitions to block 325 and ends. This process may be repeated periodically, depending on the detected charging condition of the battery.

EXAMPLES

Charger noise may be a detriment to touch sensing function. The intensity of the noise generated by the charger depends on the charging strength which in turn depends on the state of the battery. A Li-ion battery being charged in constant-current mode will produce stronger electromagnetic noise than when the battery is being charged in constant-voltage or top-off (trickle charge) mode. Noise characteristics for each mode are different. The host system can detect the presence of a charger and the mode-of-charging and characterize the noise in terms of intensity and spectral components. This data can then be used to determine an appropriate mitigation strategy for the touch sensing function. In some embodiments, the touch sensing function could implement sampling around to avoid the charger noise. In other embodiments, the touch sensing function could implement over-sampling or over-driving (high voltage driving) the touch sensor to mitigate the noise.

Similarly, the presence and proximity of fluorescent light can be conclusively detected by a camera sensor on the host system. This information could be communicated to the touch sensing implementation for effective counteraction.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A touch-sensitive system for an electronic device, comprising:
    a touch-sensitive surface;
    an environmental sensor; and
    a control module configured to:
        determine a charging mode of the electronic device while a battery of the electronic device is charged, the charging mode being a mode by which the battery is charged;
        continuously acquire data regarding an environmental condition from the environmental sensor; and
        reconfigure a sensing infrastructure of the electronic device by dynamically adjusting a scan rate, a scan region, a position update rate, and a touch sensor excitation signal of the touch sensitive surface based on (i) the sensed changes in the environmental condition and (ii) the charging mode of the electronic device to improve a signal-to-noise ratio of the touch-sensitive system.

2. The system of claim 1, wherein the control module is further configured to:
    characterize a frequency of electromagnetic noise generated by the charging mode; and
    dynamically adjust the scan rate and a touch sensor excitation signal of the touch sensitive surface based on the characterized noise frequency.

3. The system of claim 1, wherein the environmental sensor comprises at least one of one or more capacitive sensors, resistive sensors, pressure sensors, positional sensors, thermal sensors, optical sensors, gyroscopic sensors, electromagnetic sensors, vibration sensors, acoustic sensors, or accelerometers.

4. The system of claim 3, wherein the control module is further configured to suppress a false positive touch event based on a lack of vibration information from the vibration sensor.

5. The system of claim 1, wherein the environmental condition is one of temperature, humidity, orientation of the electronic device, and acceleration.

6. The system of claim 1, wherein the sensing infrastructure comprises an ultrasound sensing infrastructure.

7. The system of claim 1, wherein the control module is further configured to corroborate a weak ground coupling event based on a sensed position of the electronic device and dynamically reconfigure an analog front-end of the electronic device to counteract the weak ground coupling event.

8. The system of claim 1, wherein the charging mode comprises at least one of a trickle-charge mode, a constant-voltage mode, a constant-current mode, and a top-off mode.

9. A method for improving the energy efficiency of a touch-sensing system for an electronic device, comprising:
    determining a charging mode of the electronic device while a battery of the electronic device is charged, the charging mode being a mode by which the battery is charged;
    sensing one or more environmental conditions with an environmental sensor of the touch-sensing device;
    analyzing information provided by the environmental sensor;
    corroborating a touch sensing function using the information provided by the environmental sensor; and
    reconfigure a sensing infrastructure of the electronic device by dynamically adjusting a scan rate, a scan region, a position update rate, and a touch sensor excitation signal of a touch sensitive surface of the touch-sensing device based on (i) the sensed one or more environmental conditions and (ii) the charging mode of the electronic device to improve a signal-to-noise ratio of the touch-sensing device.

10. The method of claim 9, wherein sensing one or more environmental conditions further comprises sensing at least one of pressure, resistance, temperature, orientation, position, vibration, ambient light, sound, and electromagnetic interference.

11. The method of claim 10 further comprising determining a charging mode of the electronic device; characterizing a frequency of electromagnetic noise generated by the charging mode; and adjusting the sensitivity of the touch sensitive surface based on the characterized noise frequency.

12. The method of claim 9, wherein the sensitivity is a scanning sensitivity or a resolution sensitivity.

13. The method of claim 9, wherein sensing the environmental conditions comprising sensing vibration conditions and wherein corroborating the touch sensing conditions comprises corroborating a touch event on the touch sensitive surface with a detected vibration.

14. A non-transitory computer-readable medium comprising instructions that, when executed, causes a processor to perform the method of:
    sensing one or more environmental conditions with an environmental sensor of an electronic device;
    determining a charging mode of the electronic device while a battery of the electronic device is charged, the charging mode being a mode by which the battery is charged;
    characterizing a frequency of electromagnetic noise generated by the charging mode; and
    reconfiguring a sensing infrastructure of the electronic device by dynamically adjusting a scan rate, a scan region, a position update rate, and a touch sensor excitation signal of a touch sensitive surface of the electronic device based on (i) the sensed environmental condition and (ii) the characterized electromagnetic noise frequency to improve a signal-to-noise ratio of the electronic device.

15. The non-transitory computer-readable medium of claim 14, wherein the sensitivity is a scanning sensitivity or a resolution sensitivity.

16. The non-transitory computer-readable medium of claim 14, wherein sensing one or more environmental conditions further comprises sensing at least one or more of pressure, resistance, temperature, pressure, orientation, vibration, ambient light, sound, and electromagnetic interference.

17. An apparatus for energy efficient touch processing, comprising:

a touch sensitive surface of an electronic device;

means for determining a charging mode of the apparatus while a battery of the apparatus is charged, the charging mode being a mode by which the battery is charged;

means for sensing one or more environmental conditions of the touch-sensitive surface;

means for analyzing information provided by an environmental sensor;

means for corroborating a touch sensing function using the information provided by the environmental sensor; and means for reconfiguring a sensing infrastructure of the electronic device by dynamically adjusting a scan rate, a scan region, a position update rate, and a touch sensor excitation signal of the touch sensitive surface based on (i) the sensed one or more environmental conditions and (ii) the charging mode of the electronic device to improve a signal-to-noise ratio of the touch sensitive surface of the electronic device.

18. The apparatus of claim 17 further comprising means for determining a charging mode of the electronic device; means for characterizing a frequency of electromagnetic noise generated by a charging mode of the electronic device; and means for dynamically adjusting a scan rate and a sensor excitation signal of the touch sensitive surface based on the characterized electromagnetic noise frequency.

19. The apparatus of claim 17, wherein the sensitivity is a scanning sensitivity or a resolution sensitivity.

20. The apparatus of claim 17, wherein the means for sensing comprises a capacitive sensor, resistive sensor, pressure sensor, positional sensor, thermal sensor, optical sensor, gyroscopic sensor, electromagnetic sensor, vibration sensor, acoustic sensor, or accelerometer.

21. The apparatus of claim 17, wherein the apparatus is a mobile telephone.

22. The apparatus of claim 17, wherein the means for dynamically adjusting the sensitivity of the touch sensitive surface comprises a processor configured to adjust the scan rate of the touch sensitive surface.

* * * * *